April 30, 1968 D. J. SIKORRA 3,381,229

BIPOLAR CAPACITIVE INTEGRATOR WITH FAST RESET

Filed Dec. 2, 1964

INVENTOR.
DANIEL J. SIKORRA

BY [signature]

ATTORNEY

United States Patent Office 3,381,229
Patented Apr. 30, 1968

3,381,229

BIPOLAR CAPACITIVE INTEGRATOR WITH FAST RESET

Daniel J. Sikorra, Champlin, Minn., assignor to Honeywell Inc., a corporation of Delaware Filed Dec. 2, 1964, Ser. No. 415,524
8 Claims. (Cl. 328—127)

The present invention pertains generally to integrators and more specifically to non-linear integrators. Even more specifically, the invention lies in a method for and circuitry for obtaining a fast reset time when the polarity of an input signal is changed.

As is known to those skilled in the art, a non-linear integrator of the fast reset type is an integrator which will reset when the input signal changes in polarity and start from zero output at this point in time. It will then integrate until the input again changes polarity. This type of integrator is known to those skilled in the art, but the ones which are known have various limitations which will be described in greater detail later. One of the limitations is that the source of voltage or current supplying the integrator must be of a low impedance in order for the integrating capacitor to discharge quickly. This is due to the method of discharge of the capacitor through the signal source, rather than directly to ground as will be described in conjunction with the present invention. In view of this method of discharge in the prior art, the input signal is not received by the integrating amplifier until after the capacitor is discharged and, therefore, the amplifying action of the amplifier cannot be utilized to help discharge the capacitor faster. In the present invention, however, the amplifier output circuit provides a discharge path for the capacitor during reset. In view of the relatively long discharge time of the integrating capacitor of the prior art non-linear integrators, a relatively long time passed during which no integration could take place after the input signal changed in polarity. During this time there would be no integration of the input signal and, therefore, no output signal representative of the integrated value of the input. This would thus tend to introduce errors into the output since the signal would not represent the integrated output during the reset time.

When the prior art provided non-linear integrators for operating in both polarities of output signals, two or more amplifiers were used in one circuit. The present invention eliminates the need for more than one amplifier and, therefore, produces bipolar non-linear apparatus with a minimum of components.

It is, therefore, an object of my invention to improve non-linear integrating apparatus by minimizing reset time.

Further objects and advantages of my invention will be apparent from a reading of the appended claims in conjunction with the specification and the drawing in which:

Figures 1, 3:
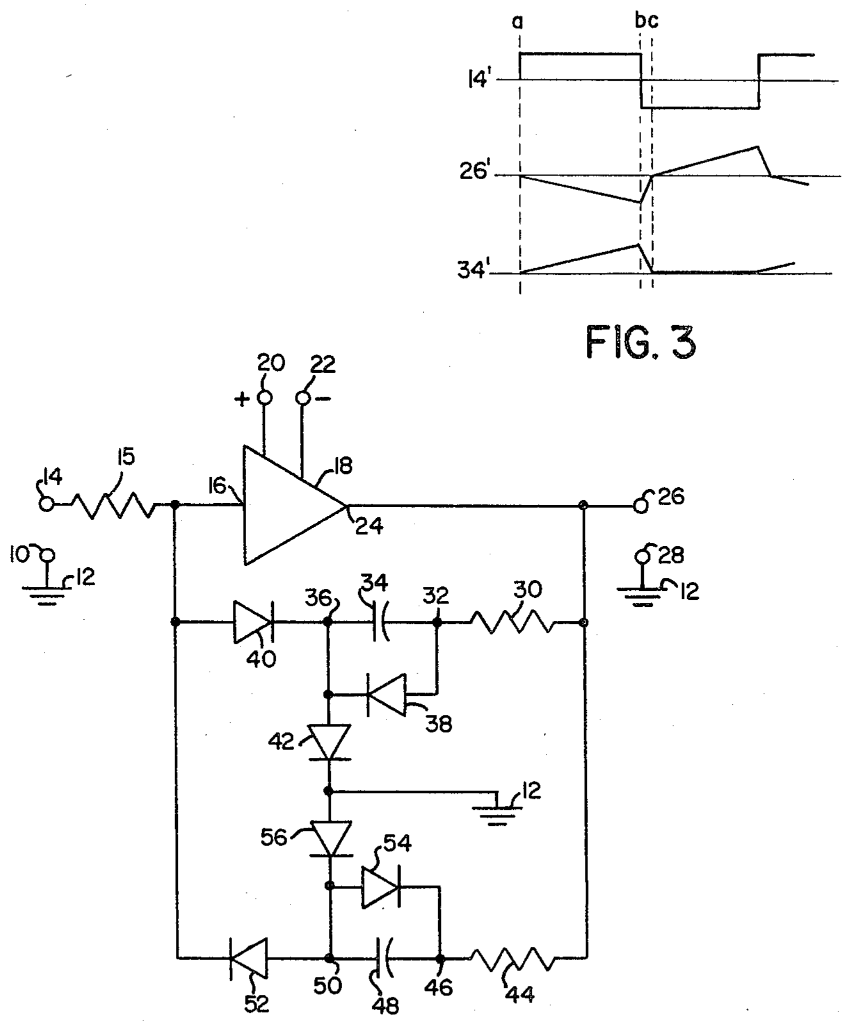
FIGURE 1 is a schematic drawing of the invention.
FIGURE 3 illustrates waveforms at appropriate points within the circuit diagram of FIGURE 1.

In FIGURE 1 a first signal input means 10 is connected to ground or reference potential 12. A second signal input means or terminal 14 is connected through a resistive means 15 to an input 16 of an amplifying means or signal inverting means 18. Terminals 20 and 22 are shown supplying power to amplifier 18. Terminal 20 is marked as supplying positive power while terminal 22 supplies negative power, both with respect to ground terminal 12. The source of supply for these terminals is not shown. An output 24 of amplifier 18 is connected to an output terminal 26. A second output terminal 28 is connected to ground 12. An impedance means or resistor 30 is connected between output 26 and a junction point 32. A capacitive impedance means or integrating means 34 is connected between the junction point 32 and a junction point 36. A diode means, rectifying means, unidirectional means or logic means 38 is connected in parallel with capacitor 34 such that the direction of easy current flow from anode to cathode and is toward junction point 36. A diode 40 is connected between input means 14 and junction point 36 such that the direction of easy current flow is toward junction point 36. A diode means 42 is connected between junction point 36 and ground 12. The components 30, 34 and 40 constitute a first feedback network with the diodes 38 and 42 providing a portion of the logic means or switching means. The logic means first mentioned is used to prevent simultaneous charging of capacitors 34 and 48. As will be realized, other means such as transistors may be used for the logic means. A resistor or impedance means 44 is connected between output 26 and a junction point 46. A capacitive means or integrating means 48 is connected between junction point 46 and a junction point 50. A diode 52 is connected between junction point 50 and input 14 such that the direction of easy current flow is toward input 14. A diode 54 is connected between junction points 50 and 46 such that the direction of easy current flow is toward junction point 46. A diode 56 is connected between ground 12 and junction point 50 such that the direction of easy current flow is toward junction point 50. While some of the diodes have been described only as being "diodes," the previous terms mentioned in conjunction with diodes 38 and 40 are intended to apply to the rest of the diodes. In other words, they are to be considered for the purposes of the claims and the rest of the specification to be logic means, switching means, rectifying means, unidirectional means or nonlinear devices. The resistor 44 in combination with capacitive means 48 and diode 52 comprise a second feedback path similar to that previously described. Also, the diodes 54 and 56 comprise in part a logic or switching means function similar to that provided by diodes 38 and 42.

Figure 2:
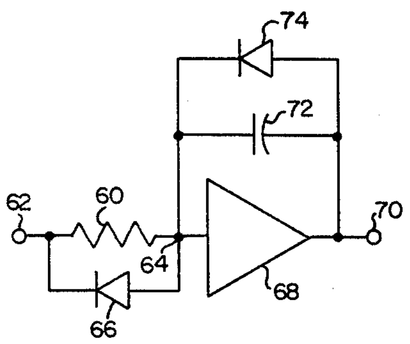
FIGURE 2 is a circuit diagram of the prior art.

In FIGURE 2 a resistive means 60 is connected between an input 62 and a junction point 64. A diode 66 is connected in parallel with resistor 60 and is poled so that current flow is toward input 62. An amplifier 68 is connected between junction point 64 and an output means 70 to supply a signal to output means 70. A capacitor 72 is connected in parallel with amplifier 68 between junction point 64 and output terminal 70. A diode 74 is connected in parallel with capacitor 72 and is poled so that the direction of easy current flow is towards junction point 64.

The waveforms of FIGURE 3 have designations such as 14′, 26′ and 34′. The numerical designations of these waveforms correspond to the same number without the prime in FIGURE 1. In other words, the waveform 14′ appears at terminal 14 in FIGURE 1. Waveform 34′ is indicative of the voltage waveform which appears across capacitor 34. Times designated as *a* and *b* represent rise and fall periods in the input signal 14′ while *c* is the time after *b* before integration occurs in capacitor 48.

As mentioned previously, FIGURE 2 represents a prior art embodiment of non-linear integrators. In operation, an input signal is applied to terminal 62 and may be assumed to be of a positive polarity. This signal is phase inverted in amplifier 68 and appears at terminal 70 as a negative polarity output. Capacitor 72 charges due to the voltage difference between junction point 64 and 70. If amplifier 68 is a very high gain amplifier, the junction point 64 will be very close to a ground or reference potential (not shown in this drawing). Therefore, the input current applied at terminal 62 will flow through resistor 60 to capacitor 72 to initiate charging this capacitor. Capacitor 72 will continue charging until the input applied at terminal 62 changes to a negative potential. At this point, current will flow from capacitor 72, through diode 66 and through the source applying a signal to input 62. If capacitor 72 is to discharge quickly, the source of input signal must be of low impedance relative to resistor 60. A low impedance source is normally attributed to a voltage source while current sources, with their associated high internal impedances, are normally utilized in expressing the relationships of an integrator. It is, therefore, often the case that a comprise must be reached as to the internal impedance of the source of signal applied to terminal 62. The closer the source supplying a signal to terminal 62 is to a current source, the higher the internal resistance and, therefore, the longer the discharge time of capacitor 72. As capacitor 72 takes longer to discharge, the reset time for the integrating apparatus becomes longer. As will be noted, the input signal must go more than approximately one-half volt in the negative direction for the reset action to take place quickly. This is true because of the threshold voltage drop in the forward direction through diode 66. The diode 74 prevents the output from amplifier 68 from going a useful amount in the positive direction and, therefore, is intended for integration of positive going inputs only. Further information can be obtained as to the operation of this prior art non-linear integrator from a AIEE transactions paper presented at the AIEE winter general meeting in New York, Feb. 2–7, 1958, by J. C. Clegg from the University of Utah.

In describing the operation of FIGURE 1, it will be noted that the diodes 40 and 52 are poled in opposite directions so that only one of the feedback circuits is operable to provide the integrating function at a given time. For proper operation of the present circuit, amplifier 18 must be of the type in which a phase reversal occurs between input and output. The invention is not limited to an amplifier which has a phase reversal between input and output, but rather to a type of integrating apparatus which discharges the integrating capacitor through a path other than that of the source of supply signal. Therefore, the statement that the amplifier is a phase reversing type amplifier is merely intended to cover the situation as shown in the present circuit. For the purposes of explanation, it will be assumed that a positive signal is applied to input 14 of FIGURE 1. This positive input signal will supply a very small error current to the input of amplifier 18 and provide a negative going output signal at terminal 26. The rest of the input current will flow through diode 40 to help charge capacitor 34 in a manner such as shown by the waveform 34′. Waveform 34′ is the voltage at terminal 36 with respect to the voltage at terminal 32 and is the voltage which appears across capacitor 34. Since the output is negative with respect to the input, it may be determined, as previously mentioned, that diode 52 will prevent any action from occuring in the feedback loop containing capacitor 48. At time $b$ in the waveforms shown in FIGURE 3, it may be assumed that the input becomes a negative signal. At this time, current will start flowing from the input of amplifier 18 toward input terminal 14. This will cause the output of amplifier 18 to attempt to reverse in output polarity. This will also prevent further current flow through diode 40. Until there is current flow through 52, all the current flow must come from the input 16 of amplifier 18. This means that amplifier 18 can very rapidly reset output by means of discharge path 26, 30, 32, 34, 36, 42 and 12 so that a feedback current starts flowing from capacitor 48 through diode 52 to provide most of the current flow into the source supplying a signal to terminal 14. This current flow from capacitor 48 will occur at time $c$ in FIGURE 3. The time between $b$ and $c$ is exaggerated for clarity and in actual circuits will be an extremely short period of time. Between times $b$ and $c$ the diode 42 will become conductive and current flow will occur from output terminal 26 through resistor 30, capacitor 34, diode 42, and ground 12. This current flow will very quickly discharge capacitor 34 since the predominant impedance restricting current flow is resistor 30. This impedance can normally be much lower than the high impedance found in a signal source such as would be used to supply the signal to be integrated for FIGURE 2. Further, this current flow does not interfere with the input signal to the amplifier such as occurs in the prior art shown in FIGURE 2. Rather, since the current flow upon discharge of capacitor 34 is to ground rather than through resistor 15, amplifier 18 can very quickly reset the output potential. Resistors 30 and 44 can be of a very low impedance if the amplifier 18 has a low output impedance. A low output impedance is a normal characteristic of a high gain integrating amplifier. For this reason a discharge time of capacitor 34 is very small. At approximately a point in time designated as $c$ in FIGURE 3, diode 52 will start to conduct and current will flow from capacitor 48 out through resistor 15 and to the source connected to input 14. Capacitor 48 will then start charging and an integrated output will be obtained at output terminal 26 such as shown in waveform 26′. When capacitor 34 is fully discharged, the current flow will be through diode 38 rather than through capacitor 34. The purpose of diode 38 is to keep capacitor 34 in a discharged condition so that it will be immediately ready to provide an integrating function when the polarity of the input signal again changes.

The type of circuit just described is very useful in the forward part of a servomechanism loop to reduce steady state errors. If a servomechanism loop does not come exactly to a zero output due to momentary friction and other factors, an error signal will build up and cause large servo overshoot. An integrator can build up this error signal so as to provide a large enough output to eventually drive the motor back to a zero servo error condition. However, a linear integrator introduces a large amount of time delay and produces considerable overshoot and possible instability in some applications. This occurs since the servomechanism motor is driven a considerable distance past the zero output point due to the fact that the linear integrator provides an output until the integrated amount of the input reduces the output of the amplifier to zero potential. A non-linear integrator on the other hand will quickly reset to zero output when the input changes in polarity. Therefore, the faster the resetting of the output signal, the less error is introduced due to overshoot of the motor used in the servomechanism loop.

More of these details as to the advantages of non-linear integrators may be found in the AIEE paper previously mentioned.

While the circuit shown and described used a capacitor for the integrating element, the invention is not limited to a capacitor but is applicable to any other integrating element whose effect can be switched out of a circuit upon the reversal of an input signal applied to the integrating apparatus. Further, the apparatus is not limited to the use of diodes for the logic circuitry or switching means, but can be any switching circuitry sensitive to input signal polarity changes.

I, therefore, wish to be limited only by the scope of the appended claims in which I claim:

1. Integrating apparatus comprising, in combination: high gain amplifying means including input means and output means;

a first feedback path, utilized for integrating negative input signals, comprising a series connection of a first resistance means, a first capacitive means in parallel with a first diode means, and a second diode means having an anode connected to an anode of said first diode means;

means connecting said first resistance means of said first feedback path to said output means of said amplifying means and a cathode of said second diode means to said input of said amplifying means;

a second feedback path, utilized for integrating positive input signals, comprising a series connection of a second resistance means, a second capacitive means in parallel with a third diode means and a fourth diode means having a cathode connected to a cathode of said third diode means;

means connecting said second resistance means of said second feedback path to said output means of said amplifying means and an anode of said fourth diode means to said input of said amplifying means;

reference potential means;

fifth diode means connected between said anode of said first diode means and said reference potential means to allow current flow away from said reference potential means; and sixth diode means connected between said cathode of said third diode means and said reference potential means to allow current flow toward said reference potential means.

2. Integrating apparatus comprising, in combination:

amplifying means including input means and output means;

a first feedback path, utilized for integrating negative input signals, comprising a series connection of a first integrating means in parallel with a first unidirectional means and a second unidirectional means;

means connecting said first integrating means of said first feedback path to said output means of said amplifying means and said second unidirectional means to said input of said amplifying means;

a second feedback path, utilized for integrating positive input signals, comprising a series connection of a second integrating means in parallel with a third unidirectional means and a fourth unidirectional means;

means connecting said second integrating means of said second feedback path to said output means of said amplifying means and said fourth unidirectional means to said input of said amplifying means;

reference potential means;

fifth unidirectional means connected between said first unidirectional means and said reference potential means to allow current flow away from said reference potential means; and sixth unidirectional means connected between said third unidirectional means and said reference potential means to allow current flow toward said reference potential means.

3. Integrating apparatus comprising, in combination:

amplifying means including input means and output means;

first feedback means, utilized for integrating negative input signals, comprising a first integrating capacitive means and a first unidirectional means;

means connecting said first feedback means between said output means of said amplifying means and said input means of said amplifying means;

second feedback means utilized for integrating positive input signals, comprising a second integrating capacitive means and a second unidirectional means;

means connecting said second feedback means between said output means of said amplifying means and said input means of said amplifying means;

reference means; and diode logic means connected to said first and second feedback paths and to said reference means for discharging the capacitive means of one feedback path while preventing discharge of the capacitive means in the feedback path being used for integration.

4. Integration apparatus wherein it is desirable to have fast reset action upon change of polarity of an input signal comprising, in combination:

amplifier means including input means and output means;

first and second capacitive integrating feedback paths connected between said output means and said input means of said amplifier means;

means for supplying an input signal to said input of said amplifier means; and diode logic means connected to said first and second capacitive feedback paths for allowing a capacitive element in said first feedback path to be charged upon application of a first polarity input signal to said amplifier means while at the same time preventing charging of a capacitive element in said second feedback path and further for discharging said first capacitive element upon change in polarity of said input signal while immediately thereafter allowing the capacitive element in said second feedback path to be charged for integration purposes.

5. Integration apparatus wherein it is desirable to have fast reset action upon change of polarity of an input signal comprising, in combination:

amplifier means including input means and output means;

first and second integrating feedback paths connected between said output means and said input means of said amplifier means;

means for supplying an input signal to said input of said amplifier means; and logic means connected to said first and second energy storage feedback paths for activating an integrating element in said first feedback path upon application of a first polarity input signal to said amplifier means while at the same time deactivating an integrating element in said second feedback path and further for deactivating the integrating element in said first feedback path upon change in polarity of said input signal while at the same time activating the integrating element in said second feedback path for integration purposes.

6. Non-linear integrating apparatus comprising, in combination:

amplifying means including input means, output means and first and second non-linear integrating type feedback means, said first feedback means providing the integrating function when an input signal having a first characteristic is applied to said input means of said amplifying means and said second feedback means providing the integrating function when an input signal having a second characteristic is applied to said input means of said amplifying means; and logic switching means connected to said feedback means of said amplifying means for deactivating the integrating function of said first feedback means when a signal having said second characteristic is applied to said input means of said amplifying means and for deactivating said integrating function of said second feedback means when a signal having said first characteristic is applied to said input means of said amplifying means.

7. Integrating apparatus comprising, in combination:

high gain amplifying means including input means and output means;

a feedback path, utilized for integrating one polarity of an input signal, comprising a series connection of a resistance means, a capacitive means in parallel with a first diode means, and a second diode means having a first terminal thereof connected to a like terminal of said first diode means;

means connecting said resistance means of said feedback path to said output means of said amplifying means and a second terminal of said second diode means to said input of said amplifying means;

reference potential means; and third diode means connected between said first terminal means of said second diode means and said reference potential means to allow current flow through said third diode means when an input signal is applied to said amplifying means of a second polarity.

8. Integration apparatus wherein it is desirable to have fast reset action upon change of polarity of an input signal comprising, in combination:

amplifier means including input means and output means;

capacitive integrating feedback means connected between said output means and said input means of said amplifier means;

means for supplying an input signal to said input of said amplifier means; and logic means connected to said capacitive feedback means for allowing a capacitive element in said feedback means to be charged through a first path including said means for supplying an input signal upon application of a first polarity input signal to said amplifier means and further for discharging said capacitive element through a second path isolated from said means for supplying an input signal upon change in polarity of said input signal.

No references cited.

ARTHUR GAUSS, *Primary Examiner.*

R. H. PLOTKIN, *Assistant Examiner.*